G. D. HAWORTH.
Corn Harvester.
No. 17,832.
Patented July 21, 1857.
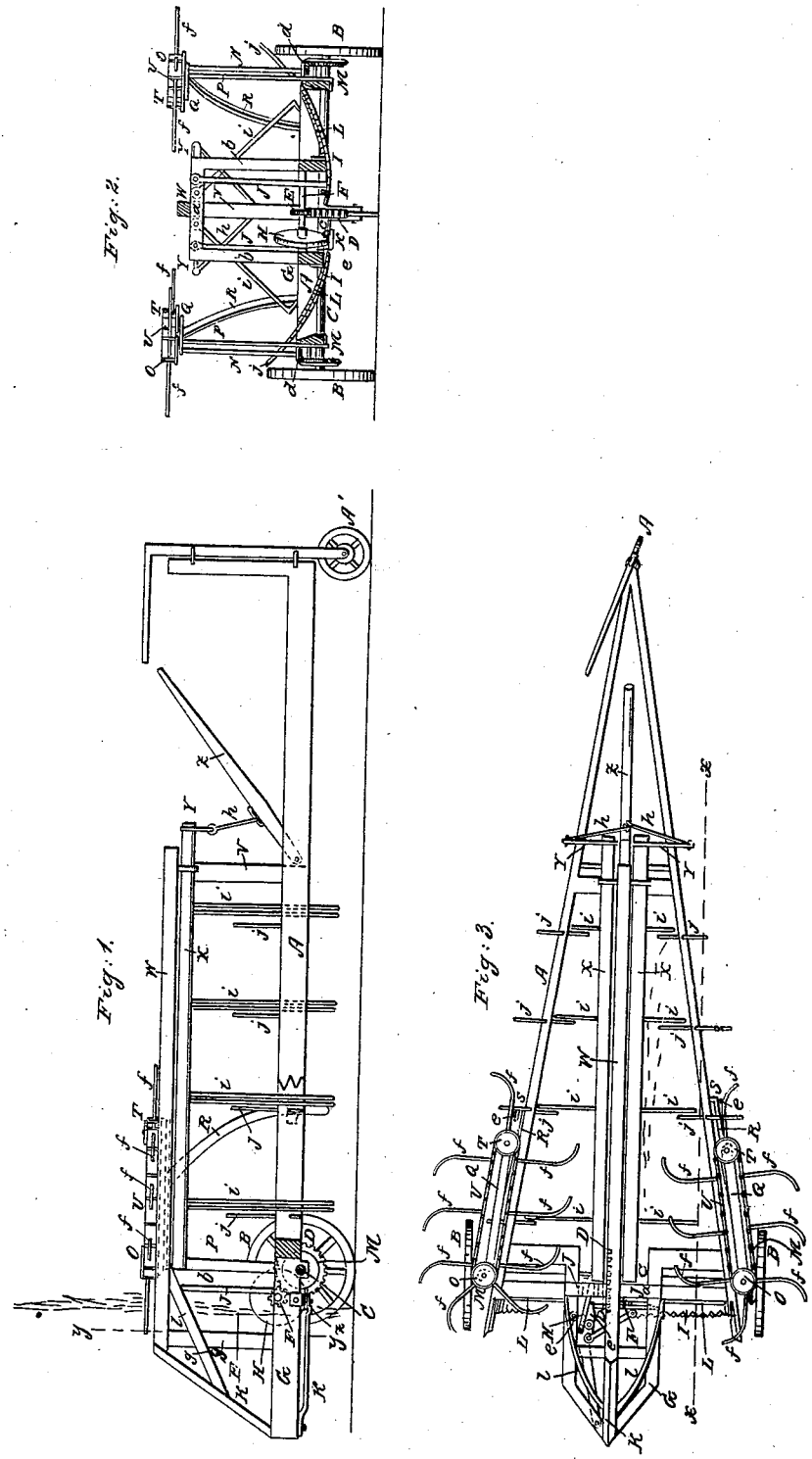

UNITED STATES PATENT OFFICE.

G. D. HAWORTH, OF MECHANICSBURG, ILLINOIS.

IMPROVEMENT IN CORN-HARVESTERS.

Specification forming part of Letters Patent No. 17,832, dated July 21, 1857.

*To all whom it may concern:*

Be it known that I, G. D. HAWORTH, of Mechanicsburg, in the county of Sangamon and State of Illinois, have invented a new and Improved Corn or Maize Harvester; and I do hereby declare that the following is a full, clear, and exact description of the same, reference being had to the annexed drawings, making a part of this specification, in which—

Figure 1 is a longitudinal vertical section of my improvement, $x x$, Fig. 3, showing the plane of section. Fig. 2 is a transverse vertical section of the same, $y y$, Fig. 1, showing the plane of section. Fig. 3 is a plan or top view of the same.

Similar letters of reference indicate corresponding parts in the several figures.

To enable those skilled in the art to fully understand and construct my invention, I will proceed to describe it.

A represents the frame of the machine, which is of triangular form, the pointed end being the back part of the frame. The front end of the frame A is supported by two wheels, B B, the axle C of which extends across the front end of the frame A. The wheels B are placed loosely on the arms of the axle C, and are connected thereto by the well-known mechanical device, the pawl and ratchet, so that when the machine is moved forward the axle will rotate with the wheels, and remain stationary when the machine is moved backward.

On the axle C, at about its center, a toothed wheel, D, is secured. This wheel gears into a pinion, E, which is placed on a shaft, F, fitted in a projecting frame, G, attached to the front end of the main frame A.

On the shaft F a cam, H, is fitted or placed. This cam may be described as being a wheel placed obliquely on the shaft F, as shown in Figs. 2 and 3.

I I represent two cutters, which are formed of steel plates or strips curved in segment form, and having triangular or saw-shaped teeth, as shown clearly in Fig. 1. The inner ends of the cutters are attached to rods J J, the upper ends of which are pivoted to a cross-piece, $a$, placed on the upper ends of two uprights, $b b$, attached to the frame G. The inner ends of the two cutters are attached to the inner end of a horizontal arm, K, the outer end of which is pivoted to the front end of the frame G. To the inner end of the arm K two friction-rollers, $c c$, are attached, and the edge of the cam works between these rollers, as shown clearly in Figs. 2 and 3.

Directly over the cutters I I stationary fingers or teeth are placed. These fingers or teeth are formed on plates or strips L, and are of the same shape as the teeth of the cutters I I. The plates L are attached permanently to the front end of the frame A and the back part of the frame G. The plates are bent or curved in the same form as the cutters, and the cutters work in contact with the under surfaces of the plates or strips L, as plainly shown in Fig. 2.

On each end of the axle C a bevel-toothed wheel, M, is placed. These wheels gear into pinions $d d$, which are attached to the lower ends of vertical rods or shafts N N, placed one at each side of the frame. At the upper end of each rod or shaft N a pulley, O, is placed. The bearings of these shafts are attached to bars P P, the lower ends of which are placed loosely on the axle C. The upper ends of these bars have horizontal bars Q attached to them, one to each, and curved or segment bars R are attached to the ends of the bars Q, the lower ends of the bars R passing through loops S, attached to the sides of the frame A. A set-screw, $e$, passes through each loop S. (See Fig. 3.)

To the ends of the bars Q pulleys T are attached, one to each, and around the pulleys O T endless chains U work, said chains having curved teeth $f$ attached to them.

V is an upright attached to the back part of the frame A, and W is a horizontal bar, which is connected to the upper end of the upright V and to the cross-piece $a$, and to the upper end of an upright, $g$, placed on the frame G.

X X represent two shafts, which are fitted at one end in bearings attached to the uprights V, the opposite ends being fitted in the cross-piece $a$. The ends of the shafts X X, near the upright V, have each an arm, Y, attached, and the ends of these arms are attached by rods $h h$ to a lever, Z, the lower end of which is connected by a joint or pivot to the frame A.

To each shaft X a series of arms, $i$, attached to them extend down to a level with the side pieces of the frame A. The side pieces of the frame A have an arm, $j$, placed in them obliquely.

To the front end of the bar W, and to the front end of the frame G, a plate, $k$, is attached, said plate being in an inclined position, and to the plate $k$ and uprights $b\ b$ curved plates $l$ are attached, one plate $l$ to each upright. The use of these plates will be presently shown. The back part of the frame A is supported by a swivel-wheel, A'.

The operation is as follows: As the machine is drawn along a reciprocating motion is given the cutters I I, in consequence of the cam H working between the two rollers $e\ e$. The cutters work or move in the arc of a circle. The stalks, as the machine is moved along, are deflected from the center of the machine toward the cutters by the plates $k\ l\ l$, and the stalks are forced toward the cutters by the teeth $f$ of the endless chains U U, the chains being driven by the gearing M D. The cut stalks fall down upon the arms $i$ of the shafts X X, and the arms $j$, which pass through the sides of the frame A, and when sufficient stalks are cut and placed upon the machine to form a sheaf or gavel the shafts X X are turned by the driver, who operates the lever Z, and thereby throws the arms $i$ of the two shafts X X toward each other, the stalks falling to the ground by their own gravity. The arms $i$ are moved back to their original position immediately after the stalks are discharged. In consequence of having the cutters I I curved in segment form and attached to suspended rods, the cutters work or move in the arc of a circle. The cutters are operated with less friction than when the usual reciprocating cutters are employed, because they have a less bearing-surface. The oscillating movement is also a much easier one than the reciprocating movement in a right line. The operation of the sickle is smoother, there is less jarring, and the crank is dispensed with. The endless chains U may be placed in a more or less inclined position to suit the height of the stalks by adjusting the segment-bars R in the sockets S.

What I claim as new, and desire to secure by Letters Patent, is—

The cutters I I, attached to suspended rods J, the cutters being curved and working underneath stationary teeth or fingers, substantially as described, for the purpose specified.

G. D. HAWORTH.

Witnesses:
  A. T. THOMPSON,
  H. C. THOMPSON.